May 18, 1954  C. L. GRAHAM  2,678,785
ROTATING BLADE SPEED BRAKE
Filed April 17, 1952  2 Sheets-Sheet 1

INVENTOR:
CONNELLY L. GRAHAM

BY Herbert E. Metcalf
HIS PATENT ATTORNEY

May 18, 1954
C. L. GRAHAM
2,678,785
ROTATING BLADE SPEED BRAKE
Filed April 17, 1952
2 Sheets—Sheet 2
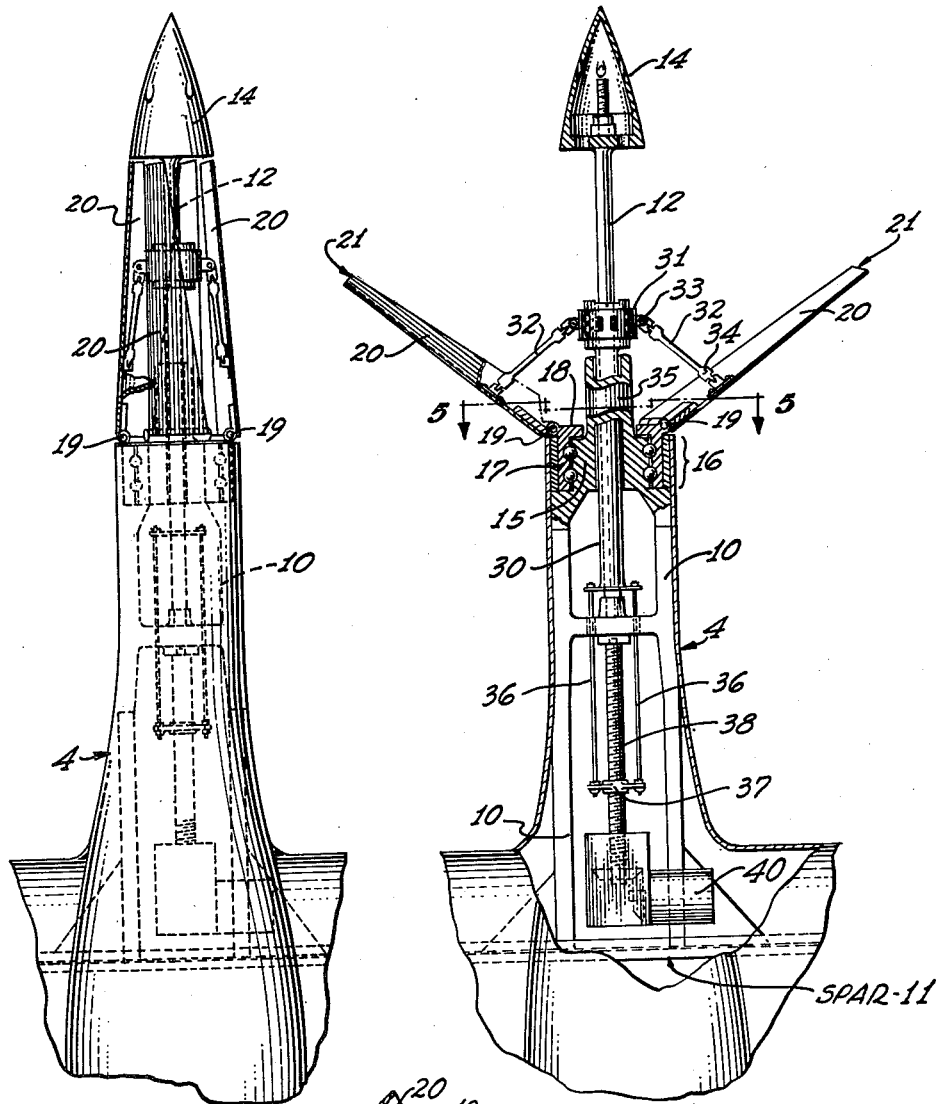
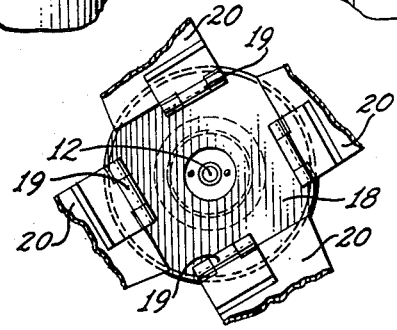
INVENTOR:
CONNELLY L. GRAHAM
BY Herbert E. Metcalf
HIS PATENT ATTORNEY Patented May 18, 1954

2,678,785

UNITED STATES PATENT OFFICE 2,678,785

ROTATING BLADE SPEED BRAKE

Connelly L. Graham, Covina, Calif., assignor to Northrop Aircraft, Inc., Hawthorne, Calif., a corporation of California Application April 17, 1952, Serial No. 282,805

4 Claims. (Cl. 244—113)

My invention relates to air brakes for airplanes, and more particularly to a dive brake in the form of a freely rotatable propeller.

The present invention is based on the fact that the drag on an airplane resulting from a freely rotatable propeller is substantially greater than the drag of a solid plate of propeller diameter in the same position.

Among the objects of my invention are:

To provide an airplane air brake having high efficiency and low weight.

To provide an airplane air brake that can readily be changed to provide maximum to minimum drag.

To provide an airplane air brake having a minimum of drag when not in use.

To provide an airplane air brake that is independent of any aircraft control surface.

To provide an airplane air brake that does not change airplane balance in use.

And to provide a simple, reliable, high drag air brake for an airplane.

Practically all high speed jet airplanes require air brakes of one kind or another, for use as dive brakes, as maneuvering brakes, or as brakes for slowing the speed of the airplane without idling or completely throttling the jet engines.

The brake of the present invention, in a preferred form, may be briefly described as a multi-bladed propeller mounted behind the trailing edge of a wing panel of an airplane. The propeller blades are movable by the pilot from a folded position where the blades are adjacent and parallel to each other and substantially parallel to the air stream, thereby imparting minimum drag to the airplane when braking is not wanted, to an angle to each other and to the air stream whereby the propeller is rotated. The propeller is mounted for entirely free rotation under the influence of the air stream and during rotation, imparts drag to the airplane in proportion to the angle of the blades to the air stream, and of course the R. P. M. The propellers are used in pairs; each propeller being equally spaced from the longitudinal axis of the airplane, and each propeller is arranged vertically so that the applied drag does not yaw, pitch, or climb the airplane. A maximum blade angle of about 60° to the axis or rotation has been found to provide ample drag under most circumstances, altho angles up to 90° can be used if desired. This angle has also been found to provide sufficient strength to withstand the stresses involved.

The invention will be more fully understood by reference to the drawings in which:

Figure 3 is a top view of the brake of Figure 2 in closed position.

Figure 4 is a top view, partly cut away, of the brake of Figure 2 in open position.

Figure 5 is a view partly in cross section and partly in elevation taken as indicated by line 5—5 in Figure 4.

Figure 1:
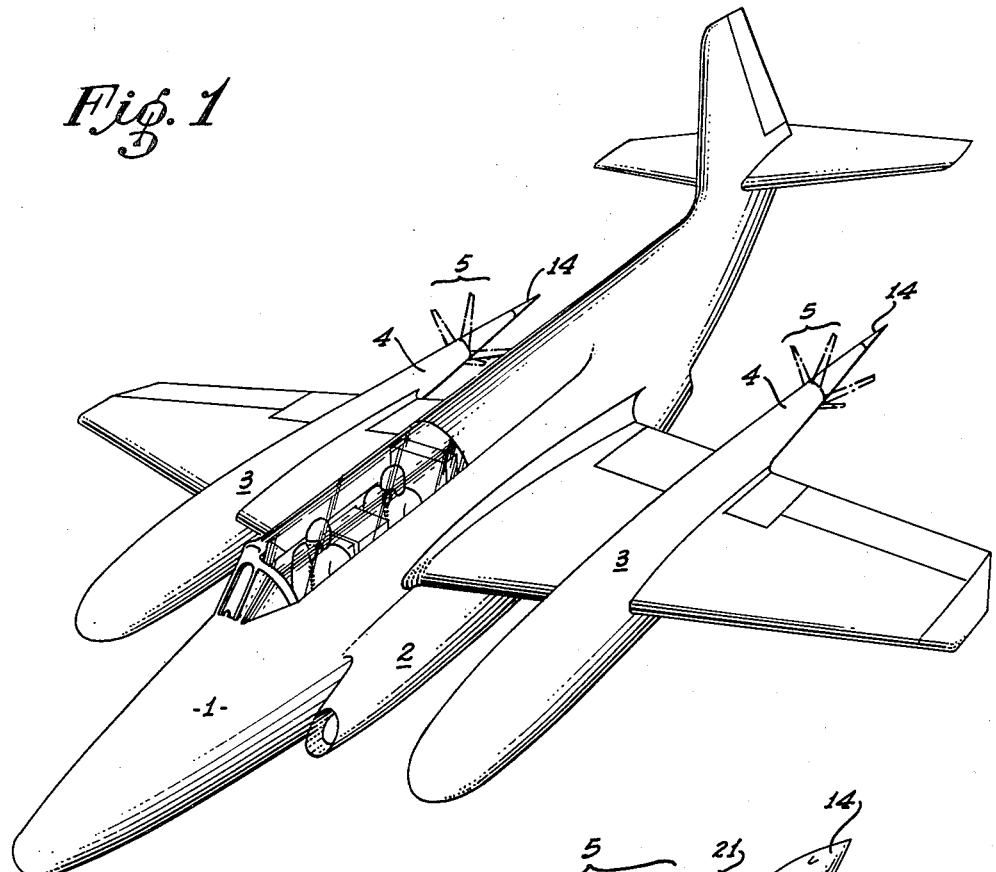
Figure 1 is a perspective view of a jet propelled fighter airplane equipped with one preferred form of the present invention.

Referring first to Figure 1, a fighter airplane 1 driven by twin jet engines; the engine nacelle 2 of only one being shown in the perspective view, is provided for example, with mid-wing nacelles 3 holding fuel or other stores. These nacelles 3 are streamlined and have tapered rear portions 4 which are provided with air brakes 5 of the present invention.

Referring next to the remaining figures for a detailed description of one preferred construction of the air brakes 5 of Figure 1, the rear portion 4 of a nacelle 3 has structural members 10 therein extended outwardly from the rear spar 11 of a wing to support a brake shaft 12 terminating in a coned fairing 14 to form the rear tip of the nacelle 3. Structural members 10 also fixedly support the inner race 15 of a relatively large ball thrust bearing 16 concentric with shaft 12, as best shown in Figure 4. The outer race 17 of bearing 16 rearwardly supports a hinge plate 18 apertured for passage of shaft 12 therethrough. Mounted on hinge plate 18 are four propeller blade hinges 19 skew mounted tangential to a circle having an axis of shaft 12 as a center. A propeller blade 20 is mounted on each hinge and, in the form shown, the blades are preferably formed of elongated thin metal plates having a somewhat airfoil shaped section, widest at their roots and tapering to square cut tips 21. The blades can be slightly twisted along their longitudinal axis to increase the angle of attack as desired. Flat plate blades, however, can be used; relying on the skew hinging to impart proper angle of attack to the propeller blades.

The skew mounting of the propeller blades 20 permits them to fold flat and substantially parallel to shaft 12 and the air stream, with their tips 21 closely adjacent the front of the fairing 14, and by using four blades 20, a satisfactory streamlining of the folded blades is accomplished, as best shown in Figure 3.

As the folded blades do not rotate, and as it is advisable to select any desired drag from minimum up to maximum, a mechanism is provided to open the blades 20 simultaneously, to an angle to the shaft 12 and the air stream whereby the air stream will rotate the propeller thus formed.

A tube 30 is provided around shaft 12, this tube being connected rearwardly to the inner race of a toggle bearing 31, which is preferably a ball thrust bearing. The outer race of toggle bearing 31 is connected to four toggle arms 32, through inner joints 33, these toggles being outwardly connected one to each of the propeller blades 20 through a propeller joint 34. Joints 33 and 34 are universal joints, as the skew mounting of the blades tends to increase the angle of incidence of the blades as they are opened.

Figure 2:
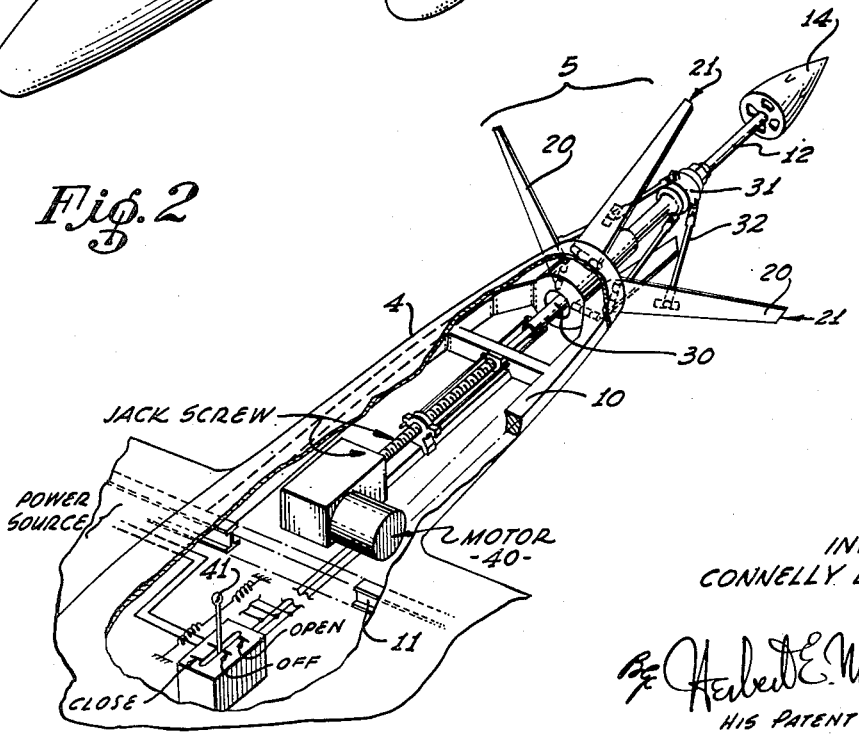
Figure 2 is a perspective view of the operating mechanism of the air brake used on the airplane shown in Figure 1.

Tube 30 is longitudinally journaled in a tube bearing 35 attached to structural members 10 and is inwardly connected to two operating rods 36 running forwardly to connect a runner nut 37 mounted to run on a drive screw 38. Drive screw 38 is rotated by a reversible motor 40 under control of the pilot, by the use of a pilot's control switch 41 which is best shown in Figure 2. Motor 40 is preferably of the type which is rigidly braked when de-energized.

A 60° opening of the blades to the air stream will provide ample drag and, at that angle, toggle arms 32 will be substantially at right angles to the blades so that the toggles are mostly under compression stresses. Furthermore, the drag imparted to the airplane with the blades at 60° to the air stream is ample and relatively close to the drag which would be attained at full opening, because further opening of the blades would increase the circle described by the blade tips very little.

Normally, propeller blades 20 are folded flat and are substantially parallel to the shaft 12. When drag is required, the pilot energizes motor 40 to pull toggle bearing 31 forwardly to open the blades. As the blades are opened, the skew mounting thereof causes them to assume a proper angle of attack in the air stream thereby causing free rotation or "windmilling" of the propellers on bearings 16 and 31. The drag produced is substantially greater than would be obtained by the use of a solid surface of the same diameter as that of the circle described by the blade tips 21, and of course the drag will increase as the blades 20 are opened to the maximum design R. P. M. position by the pilot. Naturally, the motor controls are arranged so that the blades 20 on each brake 5 are opened the same amount, to prevent yaw during braking.

Due to the fact that the freely rotating propellers are such efficient drag producers, and have an even greater drag potential, a significant saving in weight is attained when the brakes of the present invention are used, over the weight of the usual airfoil type drag surfaces on airplanes, which are generally opened into the air stream to provide braking drag to the airplane.

As various airplanes on which it may be found desirable to mount the air brake of the present invention will have varying weights and speeds, it is not possible to prescribe specific blade sizes, attack angles or rotational speeds of the braking propellers. These factors must be tailored to the individual airplane design. However, the disclosure herein clearly sets forth the principles of the present invention in such a manner that engineers skilled in aerodynamics will have no trouble specifying the proper brake design for individual airplane types.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

I claim:

1. An air braking system for an airplane comprising a coned fairing extending rearwardly from a trailing edge of said airplane, said fairing rearwardly terminating in a truncation area of substantially circular cross section, a shaft extending rearwardly from the center of said truncation area, a coned tip on the end of said shaft having a basal forwardly facing area of substantially circular cross section greater in diameter than that of said shaft and less than that of the truncation area of said fairing, a hub mounted to rotate freely on said shaft adjacent the truncation area of said fairing, a plurality of propeller blades mounted on said hub, said blades being foldable rearwardly outside of said shaft with the tips of said blades adjacent the basal area of said tip to form with said hub a generally coned streamline contour between said fairing and said tip, and means for moving said blades outwardly from said folded position to a position intersecting the airstream over said fairing for free rotation thereby.

2. Apparatus in accordance with claim 1 wherein said blades are flat plates skew mounted on said hub with the widths of said blades extending along chords of said areas.

3. Apparatus in accordance with claim 1 wherein said latter mentioned means comprises a bearing mounted to slide on said shaft together with a toggle arm attached at one end to a propeller blade, the inner ends of the toggles being attached to said bearing, and means operable by the pilot of said airplane for moving said bearing along said shaft to open and close said blades.

4. Apparatus in accordance with claim 1 wherein said latter mentioned means comprises a bearing mounted to slide on said shaft together with a toggle arm attached at one end to a propeller blade, the inner ends of the toggles being attached to said bearing, and means operable by the pilot of said airplane for moving said bearing along said shaft to open and close said blades, said blades being skew mounted on said hub with the widths of said blades extending along chords of said areas, the junctions of said toggle arms with said hub and with said blades being universal joints.

References Cited in the file of this patent

UNITED STATES PATENTS

| Number | Name | Date |
| --- | --- | --- |
| 1,464,339 | Radon | Aug. 7, 1923 |
| 1,765,818 | Alvistur | June 24, 1930 |
| 2,044,819 | Taylor | June 23, 1936 |
| 2,234,503 | Ray | Mar. 11, 1941 |
| 2,495,486 | Stevenson | Jan. 24, 1950 |

FOREIGN PATENTS

| Number | Country | Date |
| --- | --- | --- |
| 21,920 | Great Britain | of 1911 |
| 606,305 | Great Britain | Aug. 11, 1948 |
| 647,287 | Germany | July 1, 1937 |